Jan. 1, 1952 L. BALAMUTH 2,580,716
METHOD AND MEANS FOR REMOVING MATERIAL FROM A SOLID BODY
Filed Jan. 11, 1951 4 Sheets-Sheet 4

INVENTOR.
Lewis Balamuth
BY Eyre Mann & Burrowes
ATTORNEYS

Patented Jan. 1, 1952

2,580,716

UNITED STATES PATENT OFFICE 2,580,716

METHOD AND MEANS FOR REMOVING
MATERIAL FROM A SOLID BODY

Lewis Balamuth, New York, N. Y.

Application January 11, 1951, Serial No. 205,520

20 Claims. (Cl. 51—59)

1

This invention relates to a method of forming apertures in or holes through various types of materials. It is my belief that this method involves principles never heretofore used and certainly it accomplishes results not heretofore possible.

One of the extraordinary features of my invention is that it can be used for cutting holes through or cavities in extremely hard and brittle substances such ast glass, ceramics, crystals (both natural and artificially produced) and bodies such as metal borides or metal carbides (e. g. tungsten carbide). The operation of the process is not, however, limited to the treatment of such hard, brittle bodies but my method may be employed (particularly toward the upper end of the frequency range) for treating softer and somewhat more malleable materials such as certain metals, plastics and similar bodies. For the purposes of description I classify all of these materials as "hard and substantially non-yielding" to distinguish them from softer, more compressible materials such as wood and the like.

In carrying out my invention, a tool is formed having an end of the shape or conformation of the desired hole or cavity, and this tool is connected to a device which will cause the tool end to oscillate at a very high frequency though at low amplitude. It is one of the extraordinary features of my invention that ordinarily the tool end will be blunt and not shaped for cutting or drilling into hard material. Actually, in my process the tool itself does not do the cutting.

The tool end is pressed against the material to be treated (herein termed the "workpiece") and a suspension of finely-divided abrasive in an appropriate liquid is flowed around the under the end of the tool on the face of the workpiece. At the very high frequencies employed (in excess of 400 cycles per second) ordinarily no movement of the tool end is visible to the naked eye, and this is particularly true because the amplitude of movement of the tool end is necessarily small, certainly not in excess of .05 inch, and ordinarily very much less. Even though no movement of the tool end is visible, it will soon be noted that the tool, under light but continuous pressure, sinks into the workpiece (which may be a very hard material such as a sheet of glass) and eventually a hole or aperture in the workpiece is formed of a shape or cross-section corresponding directly to the shape of the tool end.

It is my belief that substantially all the actual cutting is done by the abrasive, carried in the liquid suspension, not by the tool, and that one

2 of the important factors by which my results are obtained depends upon the development of the effect known as "cavitation" within the liquid in which the abrasive material is suspended. For this reason, the presence of the liquid on the surface of the workpiece so that it is acted upon by the tool end oscillating at very high frequency is an important feature of my method.

Cavitation is a phenomenon which is generally believed to consist of a rupture of a liquid which may occur under the stress produced by vibration of an element with which the liquid is in contact. This stress is a function of the frequency and amplitude of the vibration, and cavitation occurs when the local velocity gradient (that is the acceleration) resulting from the vibration, is sufficient to reduce the internal hydrodynamic pressure to a point below the critical point of vaporization. This produces voids or cavities which collapse with tremendous force each time the tension is released. It is my belief that the advantageous effect of cavitation in the present case may be due in part or in whole to a maintenance of the abrasive particles in a constant state of dispersion whereby they are continuously moved about and re-orientated and are continuously being driven with great force against the face of the workpiece whereby each minute part of the work surface is assuredly subjected to rapidly successive destruction impacts.

Since cavitation appears to be an important element in my process, the liquid selected for suspension of the abrasive should be one readily subjected to the phenomenon of cavitation. Fortunately, ordinary water is excellent for this purpose. It is an interesting point that my method differs from the prior art processes of grinding or drilling in that vastly superior results are obtained when water is used as the suspending medium as compared to the results obtained when the medium employed is a usual cutting or lubricating oil or even kerosene.

As pointed out above, cavitation is produced when a high rate of acceleration is had at the end of the oscillating tool. Acceleration varies directly with the amplitude of movement but varies with the square of the frequency, and since a high rate of acceleration is desirable with small amplitude, it is necessary to employ high frequencies. As already stated, these frequencies should be at the rate of at least 400 cycles per second, and ordinarily I employ vastly higher frequencies which may be up to and in the ultrasonic range, that is, they may go up as high as 1,000,000 cycles per second. In theory the higher the frequency, the better, but actually as the frequency is increased, it becomes more and more difficult to have any appreciable amplitude, and I have obtained the best results so far with frequencies in the order of between 8,000 and 30,000 cycles per second. However, in giving these values, I do not wish to impose any limitation on my method as it well may be that apparatus may be designed which will make vastly higher frequencies available. That should improve the efficiency of my process.

As regards amplitude, the maximum amplitude that can be had with a given frequency is ordinarily desirable, though as stated this amplitude ordinarily will be less, and usually very much less, than .05 inch, and for ordinary purposes the amplitude will not be in excess of .01 inch. The essential relationship between the amplitude and frequency of the oscillation can best be expressed in terms of acceleration, as it is the acceleration of the tool end which is the important factor in developing cavitation and the forces which cause the cutting. I can state that as a minimum, the acceleration necessary for my process is at least 1000 times the acceleration due to the force of gravity (32.2 feet per second, per second). While this is the minimum acceleration, the acceleration may be very much greater and may be carried up to an acceleration equal to 100,000 times that due to gravity, or higher depending preferably upon the frequency available. Under one set of working conditions an acceleration of approximately 40,000 times that resulting from the force of gravity was employed with good results.

Accelerations of the type specified are of an order of magnitude totally outside of the range that has heretofore been obtainable by usual mechanical methods of drilling such as by the employment of cams or the like but these accelerations can now readily be obtained by the aid of electricity. For example, various forms of devices known as "transducers" for setting up high frequency vibrations of low amplitude have been developed for other uses. These may, for example, be operated by the aid of the phenomenon known as magnetostriction or they may employ structures similar to those of a radio loud speaker, or they may operate by the aid of the phenomenon known as the piezo-electric effect. In any event, the method of producing the oscillations of high frequency and low amplitude does not form part of the present invention, but the same may be produced in any available manner either mechanically, electrically or magnetically.

As stated above, the workpiece and the tool end should be pressed together continuously but with relatively light pressure. If low rates of acceleration on the tool end were employed, this continuous pressure would result in the tool end and the workpiece keeping continuously in contact and no cutting action would be had. However, with the very high accelerations which I employ, the inertia effects coupled with the relatively low pressures used mean that the workpiece and tool do not remain constantly in contact and this is true irrespective of whether the tool head is being pressed toward the workpiece or the workpiece pressed toward the tool. For example if the workpiece is being pressed toward the tool, it may vibrate slightly but its movements will be relatively slow and the retraction movement of the tool at high acceleration will cause cavitation to occur in the liquid. When this occurs the abrasive particles will be drawn between the tool and the workpiece and on the return movement the enormous energy of the high accelerations employed will cause these particles of abrasive to be driven against and into the workpiece. This apparently chips or cuts off minute particles of material which will be carried away by the movement of the liquid in which the abrasive is suspended.

In the above explanation of the operation of my method, I have placed considerable reliance upon the phenomenon of cavitation, but it is understood that this is only offered as a theoretical explanation and it is the empirical facts of high acceleration coupled with the abrasive suspended in an appropriate liquid plus the continuous light pressure between the tool and the workpiece which give the essential results.

Since the desired cutting effect appears to be had by the energy transmitted to the particles of abrasive, the shape of the tool end is unimportant except as it affects the shape of the desired aperture. More specifically, it is totally unnecessary and ordinarily undesirable to use a tool having a sharp point or a cutting edge. Thus the tools which I ordinarily employ may be described as "blunt," meaning by this term something much more nearly flat than an ordinary needle point or a knife edge. Actually, where a hole is to be formed through a brittle body, it is ordinarily desirable to have the tool formed with a maximum diameter or transverse dimension near its front end and usually sharp projections are employed only where the cavity is to be formed of a corresponding shape. This statement does not apply to the corners where the flat cutting face meets the sides of the tool. That corner is not a cutting edge and preferably it is sharp to maintain the shape of the hole. If the tool is unduly tapered, there may be some tendency for rubbing or grinding to take place on the side of the tool rather than for the chipping to be done on the end, and in some instances this may lead to inaccuracy of dimension and produce undue tool wear. For example, in some cases I have used a single-edged razor blade as a tool for slicing hard materials and in such case I have found that I get better cutting by using the dull edge of the blade rather than the sharp edge. In other words, my invention makes it possible to form a hole in hard, substantially non-yielding material with a tool having an end or cutting face conforming to the shape of the hole to be formed even when such tool end is not of a shape which in and of itself is adapted for cutting such a hole, as would be the case with a sharp-pointed or edged tool.

The tool is preferably made of a tough mass that is not unduly brittle, e. g., a malleable metal, but in any event there is bound to be some tool wear. Thus where great accuracy is desired it is sometimes advisable to use one tool for roughing-out the cavity and another tool for finishing it. In any event, the cavity has exactly the contour of the tool as the latter exists when the operation is stopped.

I have referred to the pressure employed as continuous but relatively light. A broad range of such pressures may be employed and the amount of pressure will vary with the nature of the material treated, the size of the tool end and the power transmitted. This matter of pressure is one that may readily be judged by the operator but for the sake of illustration, I can state that in one instance a rod-like tool having a diameter of approximately ⅛ inch vibrating at approximately 10,000 cycles per second was caused to pass through a sheet of glass in about 10 seconds using a pressure equivalent to between 12 and 40 pounds per square inch of surface.

By maintaining the pressure between the tool and the workpiece continuous (by which I mean continuous while cutting continues), the tool will advance into the workpiece as the face of the latter is cut away and this action will continue while the pressure is maintained until the hole is either cut through the material or cut to the desired depth which may, in fact, be very shallow so that in substance the cut is little more than a surface embossing. From the foregoing it will be seen that my invention has the following novel features:

1. I can cut or otherwise machine substances so brittle that they will shatter under any ordinary machining.

2. I can cut or otherwise machine substances so hard that ordinarily they can be cut or shaped only by slow grinding or by cutting processes involving high temperature flames and the like.

3. Holes of arbitrary shape can be directly cut into hard substances and where these holes do not extend through the substance, the bottom in one operation can be given a precise arbitrary contour.

4. No appreciable heat is generated in the workpiece. This is a matter of enormous importance because the usual grinding operations employed with hard substances tend to change the local grain structure setting up highly undesirable strains and stresses which may greatly reduce the value of the workpiece.

5. The tool ends may be made of usual types of malleable metal which is ordinarily substantially softer than the material being cut so that the necessity of using expensive hardened tools or diamond points is done away with.

It is quite obvious that the machine and method of my invention can be employed to accomplish many different forms of result, but for the sake of illustration the operation of my invention is shown in the accompanying drawings in which.

Figure 1:
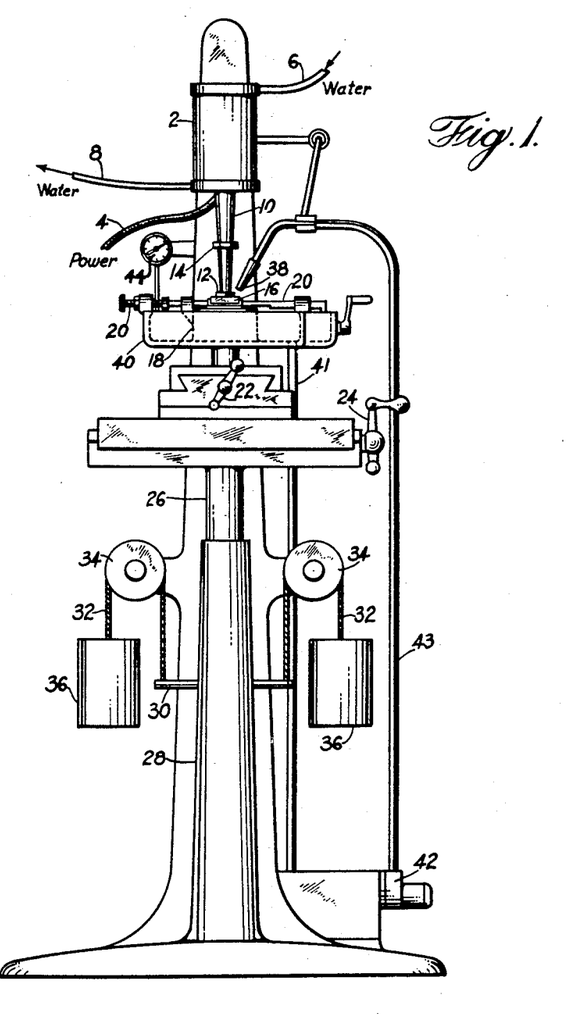
Fig. 1 is a diagrammatic view partly in section of an apparatus for carrying out my invention.

Referring to Fig. 1, 2 is a transducer to which the appropriate types of electrical energy are transmitted through the cable 4. The transducer is kept cool by water introduced through the pipe 6 and withdrawn through the pipe 8. The member 10 which extends down from the transducer is adapted to oscillate at its lower end and this lower end can itself be used for cutting, so I term it the tool member. However, due to the fact that tool wear occurs I prefer to employ a tool tip as indicated at 12 which is made in the appropriate shape and contour for the particular hole to be formed. The tool member 10 can be unscrewed from the transducer, for a screwed joint is permissible at its upper end since there is very little movement at this joint. Accordingly, the hexagonal flange 14 is provided for the purpose of using a wrench to remove or replace this tool member. It is advantageous to have the tool member 10 removable, for ordinarily the tip 12 should be brazed onto the end of the tool member.

The workpiece 16 is here shown as held on the table 18 by the clamps 20 and the position of the workpiece under the tool 10 can be determined by adjusting the handles 22 and 24 which operate a usual type of mechanism such as is employed in drill presses and the like. The workpiece 16 and table 18 with their control mechanism are mounted on column 26 which moves up and down in a base member 28. A bar 30 extends out through slots in the sides of the base member 28 and is attached to the column 26. Cables 32 connected to the bar 30 pass over pulley wheel 34 and carry counterweights 36. These weights should be heavy enough so that the cable 18 and workpiece 16 are at all times during operation tensioned upwardly against the tool tip 12.

A nozzle 38 directs a suspension of abrasive in an appropriate liquid such as water on to the face of workpiece 16. The excess abrasive flows away from the workpiece and is caught in the dish-like member 40 from which it runs off through the pipe 41. A pump 42 recirculates the suspension of abrasive through the pipe 43 back to the nozzle 38. While my process will operate to some extent if a pool of the suspension of abrasive is held on the surface of the workpiece around the tool tip, I find that the action is much more efficient where the abrasive is continuously flowed on to the workpiece and the excess withdrawn. Actually during the operation the abrasive itself is further reduced in size and it should be thrown away after being used for some time.

In operating the machine, the workman can let his hand rest on the table 18 or an appropriate weight can be placed on it to keep the workpiece out of contact with the tool tip. Appropriate power is then turned on and it is an essential feature of my invention that the transducer be so constructed that it will set up oscillations at a high frequency through a low amplitude. For example, the frequency may be 27,000 cycles per second and the amplitude may be in the order of about 0.001 inch. Under these conditions the tool end will have an acceleration equal to something in the order of 60,000 times the acceleration developed by the force of gravity. The pump 42 is operated to cause abrasive to flow onto the face of the workpiece and the table 18 is permitted to rise so that the workpiece 16 is pressed against the tool tip 12. No visible movement of the tool tip will at first be apparent but it will be noted that gradually the tool tip sinks into the workpiece. A gauge 44 is provided to measure the extent to which the tool has penetrated. When the appropriate penetration has been accomplished the table is depressed and the workpiece removed. It is usually advisable to keep the tool tip in oscillation while it is being removed from the workpiece.

Instead of having the weights 36 adjusted accurately to give the degree of pressure found necessary for maximum efficiency, these weights can be made to give slightly more pressure of the workpiece against the tool than is essential.

The operator can then rest his hand lightly on the table 18 and thereby control the amount of pressure being employed. When the machine is cutting properly it emits a characteristic hissing sound which is probably caused by cavitation. The operator soon learns to recognize this sound and can readily tell when the machine is operating correctly.

Figure 2:
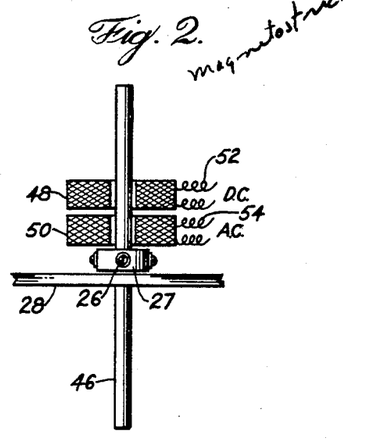
Fig. 2 is a diagrammatic view of a different form of apparatus.

In Fig. 2 I show another form of device in which the rod-shaped tool 46 is caused to vibrate longitudinally. The tool I have chosen to illustrate is in the form of a hollow tool of nickel and may be, for example, about 8 inches in length and ¾-inch in external diameter but it will be understood that the length and diameter may be varied to suit different requirements and the diameter need not necessarily be uniform throughout the length of the tool. The thickness of the wall at the lower or operative end of the tool shown may be in the order of .01-inch or so. The cross-sectional configuration of the tool either at its operative end portion or along the length of the tool need not necessarily be circular, and as a matter of fact, it is one of the unique advantages of the invention that the operative end may have, if desired, an arbitrary shape or configuration.

One way in which the operative end of the tool may be caused to oscillate at the desired high frequency and minute amplitude lies in causing the tool 46 to be set into sustained vibration by magnetostriction. While any suitable electrical circuit and generating apparatus may be employed for this purpose, I have in this illustration shown a simple arrangement diagrammatically indicating the employment of two coils 48 and 50 mounted concentrically around the tool for transmitting energy to the tool. The coil 48 is shown connected to a suitable source 52 of direct current and the coil 50 is shown connected to a suitable source 54 of alternating current. The direct current coil imposes the required bias and the alternating current coil produces the successive electrical impulses which cause the tool 46 to vibrate longitudinally. The frequency of the alternating current and its magnitude are in this case chosen with due regard to the length of the tool 46, to the frequency to the tool oscillation which is desired, and to the nature of the work which is to be performed. It is preferable with this form of device, though not absolutely essential, that resonance be established between the induced vibrations and the natural period of the tool.

Figure 3:
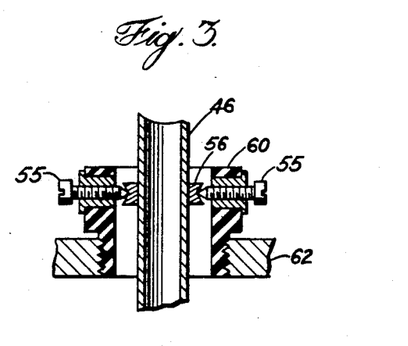
Fig. 3 is enlarged sectional view of the mounting of the tool of Fig. 2.

In a tool mounted as shown in Fig. 2 the fundamental longitudinal vibration causes a node to exist at a mid-portion of the tool and it is at this node that the tool may be secured or mounted. One way of accomplishing this mounting is shown in Fig. 3. At the node point a grooved ring 56 may be welded or otherwise secured to the tube 46, and a set of supporting studs 55 may be caused to engage with this ring. The supporting studs 55 are preferably mounted in radial fashion within a collar 60, which may be composed of any suitable material such as bakelite or the like, and this collar is firmly secured in a fixed framework 62. The detailed structure of this framework has not been illustrated and may be of any suitable or convenient character.

When a workpiece is pressed against the lower end of the tool 46 and a liquid suspension of abrasive caused to flow onto the surface of the workpiece, the rapid vibrations of the tool end will cause the particles of abrasive to cut away the material of the workpiece and the tool will gradually sink into the workpiece. If the operation is continued until the tool passes entirely through the workpiece, a hole having a cross-section corresponding to the shape of the tool will be formed in the workpiece, and since the tool is hollow, a core will be cut corresponding directly to the inner shape of the tool.

With a device of this kind, it is ordinarily desirable to withdraw the tool from the workpiece while the vibrations are continuing, for it is sometimes found that if the vibrations are stopped with the tool in the workpiece, the fit is so close that it is almost impossible to remove the tool from the workpiece. Presumably this is due to the fact that during operation the tool is actually periodically stretched and therefore has a slightly smaller diameter periodically during operation than when it is at rest. This is a phenomenon incident to the use of magnetostriction.

Fundamentally, the desirable and varied results achieved by the present process consist in forming a depression of arbitrary and predetermined contour in a solid body or a hole through such body, this being achieved by imparting the desired contour in reverse to a tool which is applied to the work and advancing the tool into the work as the abrasive progressively removes material from the work at the area of contact. Depending upon the nature and depth of the depression which is thus formed, the results achieved may be grouped for convenience into:

(a) The formation of openings extending completely through the work;

(b) The formation of recesses or cavities which extend only part way into the work and which may be very shallow;

(c) The production of cores including those which are ultimately in totally detached relation to the work and those which remain attached.

In any of these cases a hole is formed in the workpiece and when I refer to "forming a hole" I intend generically to describe all three types of results just enumerated even though the opening be broad and shallow.

Figure 4:
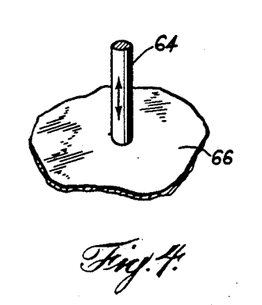
Fig. 4 is a diagrammatic view illustrating the use of a solid tool.

In Figs. 4 to 16, I show various modifications of my invention. For example, Fig. 4 illustrates the case where the tool is a solid bar 64 for making a round hole through a workpiece 66.

Figure 5:
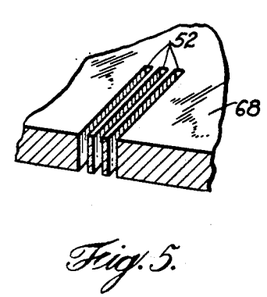
Figs. 5 and 6 are fragmentary perspective views partly in cross-section illustrating various hole-forming results achieved by the present invention.

In Fig. 5 I illustrate the formation in a workpiece 68 of a series of relatively long and narrow slots 70. These may be formed, for example, by the repeated application of a tool having a thin edge such as the dull side of a razor blade or a series of such tool members may be mounted on the end of a tool carrier such as the detachable tool member 10 of Fig. 1 so that a plurality of slots will be cut simultaneously. A tool of this type may be used advantageously for slicing material where thin slices are desired with a minimum waste of material, as for example in the slicing of quartz crystals.

Figure 6:
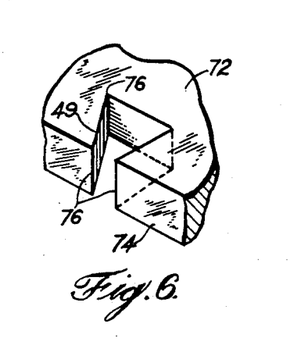
Figure 7:
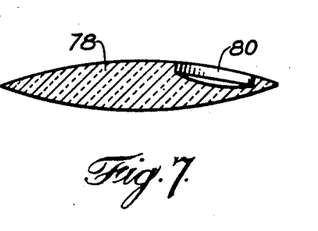
Figs. 7, 8, 9 and 10 are similar views illustrating various recess-forming results.

In Fig. 6 I have shown how a hole may be formed along the edge of a workpiece 72. Assuming the edge 74 to be substantially straight and assuming that a tool of triangular shape is employed, a dove-tailed recess may be produced as shown with sharp and clean corners 76. The formation of such a hole or recess by ordinary means is relatively difficult especially where the work is of a brittle character such as glass because the outer edges have a tendency to chip and crack and the formation of sharp interior angles is tedious and delicate, if possible at all. By means of the present invention, on the other hand, the creation of such a recess presents no special problem, and the desired result can be achieved without chipping and without marring the accuracy of the particular configuration desired.

In any case where the material-removing action of the abrasive is discontinued before it has progressed completely through the workpiece, a recess or depression is formed and by virtue of the novel manner in which its formation is accomplished, results of unusual character and highly useful may be achieved. The workpiece 78 of Fig. 7 serves to illustrate one of the innumerable, practical uses to which the invention may be applied. If it is assumed that the element 78 is a spectacle lens, then the recess 80 is admirably suited to receive a complementary smaller lens to produce a so-called bi-focal structure. The ease with which this recess may be formed, the accuracy with which its depth, shape and size conform to the corresponding characteristics of the special tool by means of which it is formed, and the fact that the tool may be caused to assume any selected arbitrary peripheral shape are facts which indicate the usefulness of the invention not only in the field of spectacle lens manufacture but in the broader optical field generally.

Figure 8:
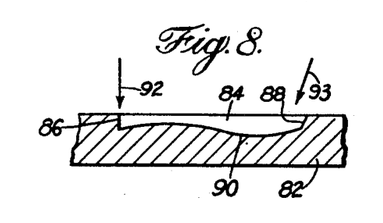

Fig. 8 is intended to illustrate, in part, the possibility of imparting any desired arbitrary contour to the floor and side walls of a recess. The work 82 has been shown with a recess 84 defined by peripheral side walls 86 and 88 and a floor 90, the floor having an arbitrary concavo-convex contour. This figure also indicates that the side walls need not be parallel to the line of force but may slope at any desired angle. It will be observed that the side wall 86 has been shown for illustrative purposes in a plane which is perpendicular to the plane of the outer surface of the work, while the side wall 88 is at a considerable angle to such perpendicular. This result, as well as the contour of the floor 90, is achieved by designing the tool in a corresponding manner. While best results would be achieved in most cases by causing penetration of the tool along a direction parallel to the wall 86, the tool may, if desired, be applied to the work at any inclination up to that which is parallel to the wall 88.

Figure 9:
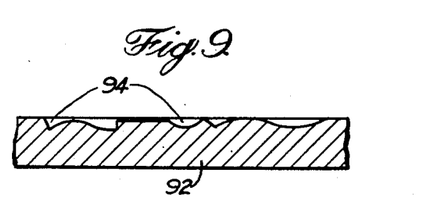
Figure 10:
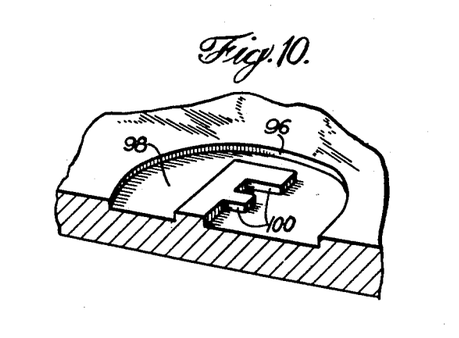

The variability of the shapes, sizes, relationships and inclinations of the recess floor and walls, as hereinbefore pointed out, and the ability to discontinue the cutting effect after any desired degree of penetration has been attained, leads to the possibility of forming oddly configured recesses of such shallow nature that an effect akin to engraving or etching may be accomplished. In such an event a recess or recesses as shown in Fig. 9 would be produced. This figure is intended to illustrate the relative thickness of the work 92, the relatively shallow (surface treating) nature of the recesses 94 and the arbitrary contours of these recesses. By imparting any desired shallow contour to the tool, a surface-engraving effect may be achieved and a cross-sectional view of such an engraved result would appear as in Fig. 9. The desired design or other imprint may be primarily delineated by the floors of the recess, or a raised effect may be produced as indicated in Fig. 10. In this figure I have shown for illustrative purposes a shallow recess having a marginal side wall 96, a floor 98 and a raised core 100 depicting in this case the letter "F." It has been found that this type of operation is valuable, for example, in forming stamping dies out of very hard materials such as tungsten carbide.

Figure 11:
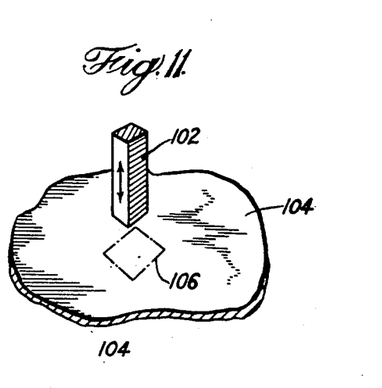
Figs. 11 and 12 are views similar to Fig. 4 illustrating procedures where macroscopic movement of the tool and workpiece take place.

While the applications of my invention thus far described illustrate cases where the only movement of the workpiece relative to the tool is substantially in the direction of movement of the tool end, it is also within the contemplation of my invention that there may be relative movement between the tool end and the workpiece. For example, Fig. 11 is intended to indicate in a more general way that a tool of the present character may be macroscopically moved relative to the work during a continuance of the basic effect. In Fig. 11 I have shown a tool 102 vibrating or oscillating as indicated by the arrow with its operative face about to be applied to a piece of work 104. The invention contemplates the simultaneous movement of the tool or work in a plane parallel to the plane of contact between the tool and work so that the entire illustrative area within the confines of the dot and dash lines 106 may be subjected to the action of the tool. In such case I have found that ordinarily it is desirable that the macroscopic movement be slow relative to the vibrational movement of the tool so that the various portions of the area 106 are subjected over and over to the cutting or wearing action of the tool rather than to a grinding action resulting from the transverse movement. The tool 102 has been illustrated as having a substantially rectangular operative face and the area defined by the line 106 has been shown substantially rectangular but it will be understood that these are so shown merely for explanatory purposes and by way of illustration.

Figure 12:
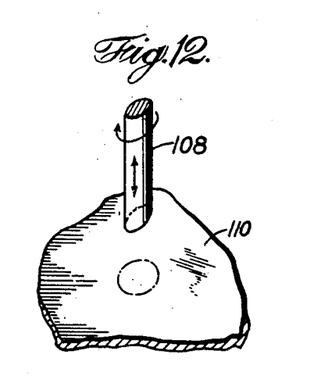

In Fig. 12 I have shown a method for drilling an accurate round hole through the workpiece without the necessity of forming the tool absolutely round. In this case the tool 108 has an oval cross-section. This tool is vibrated endwise as shown by the double-ended arrow but is also caused to rotate relatively slowly as indicated by the upper arrow. In such case the hole to be cut in the workpiece 110 will be absolutely round with a diameter equal to the maximum diameter of the oval tool as indicated in dot and dash lines. As stated, in an operation of this kind the rotation of the tool relative to its vibration should be relatively slow. For example at a maximum the tool in this example should not rotate more than once for each 150 cycles of vibration; or the rule may be expressed broadly enough to cover the operations as illustrated in both Figs. 11 and 12 by saying that the movement in a direction transverse the line of relative oscillation between the tool end and workpiece should be at such rate that during 50 oscillations the movement in the transverse direction is certainly less than the maximum diameter of the tool end. This will tend to insure that the cutting action is primarily done in accordance with my principle rather than to have a grinding effect which may cause side wear on the tool which may change its overall diameter and thus cause irregularities in the shape of the hole or might, if rapid enough, cause undesired heating.

Figure 13:
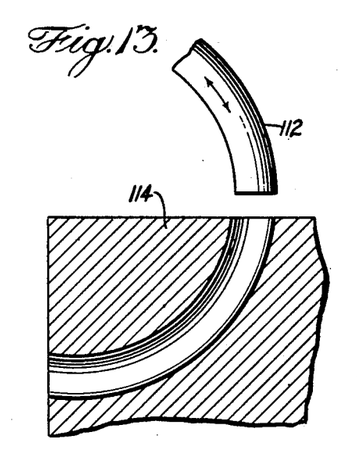
Figs. 13, 14 and 15 are similar views showing other special forms of relative movement between the tool and workpiece

In Fig. 13 I have shown the operative end portion 112 of a tool having an arcuate shape. The tool may be of any desired cross-sectional configuration and the body portion need not be of the same cross-sectional shape as the operative end which is applied to the work. A tool of this kind, notwithstanding the fact that its longitudinal axis is arcuate or curved, may be caused to vibrate longitudinally in the manner hereinbefore described, this vibration being indicated by the double-ended arrow. At 114 I have shown a workpiece in which an arcuate hole has been formed. This is achieved by applying the end of the tool 112 to the work, interposing a liquid suspension of abrasive particles between the tool end and the work and advancing the tool into the work along an arcuate direction conforming to the arcuate longitudinal axis of the tool. It will be noted that in this case, as in the others, the direction of movement of the working face is in the line of the vibrations of the tool.

Figure 14:
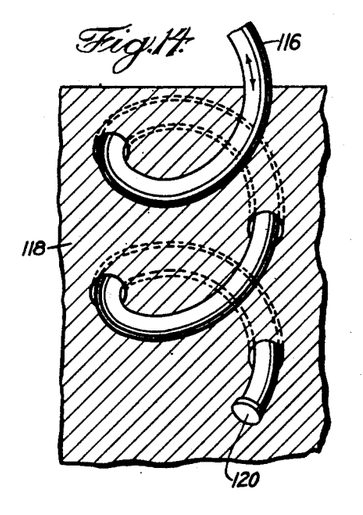

The development of this idea is shown in Fig. 14 in which the tool 116 is of helical shape. By vibrating this tool longitudinally, that is in the direction of its longitudinal axis as indicated by the double-ended arrow, and by applying the end of the tool to the workpiece 118, with abrasive interposed between the tool and work, a hole or recess may be formed which is of corresponding helical shape. Again I may point out that the cross-sectional shape of the tool may be of any selected character and ordinarily for making a complex hole of this nature the operative tool end 120 is of slightly increased cross-sectional diameter relative to the tool body. This will make for clearance through the hole.

It may also be noted that by forming helically arranged projections on a cylindrical tool and advancing the tool helically, my method may be used for cutting internal threads. In other words, the tool will have projections forming a contour in reverse corresponding to the contour of the desired threads. In such case the tool will be rotated relative to the workpiece, but as in the operation of Fig. 12 such rotation should be slow, that is not more than one rotation for each 150 cycles of vibration and usually it should be rotated much more slowly than that.

Figure 15:
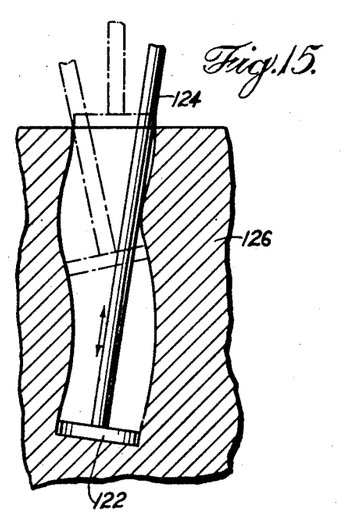

In Fig. 15 the tool 122 is of enlarged size relative to the stem or element 124. This element and with it the tool proper is adapted to be vibrated longitudinally as indicated by the double-ended arrow. By applying the tool to the workpiece 126, and slightly rocking the element 124 laterally (as indicated by the dot and dash lines) as the tool removes material from the work, a hole having an irregularly shaped axis may be formed.

Figure 16:
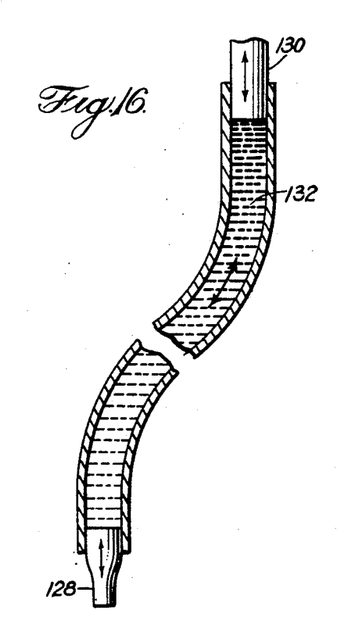
Fig. 16 is a sectional view illustrating a manner in which the tool may be caused to accelerate from a source of power removed from the tool.

In some instances it may be desirable to vibrate the tool at some distance from the point where the vibrations or oscillations are generated, as by the medium of a flexible shaft. A method of doing this is illustrated in Fig. 16. In this figure the tool portion 128 is an oscillating or vibratable element of any desirable cross-sectional shape and it is connected by means of a flexible tubing or conduit 71 with a separate operative vibrating element 130. The length of the conduit 71 is preferably so chosen that a column of liquid 132 within it has a length equal to an integral number of half-wave lengths of the vibration or oscillation of the element 130. This arrangement will tend to cause the vibrational energy to be transmitted to and through the liquid column 132 to the tool portion 128. However, I have discovered that it is advisable that the liquid making up the column 132 should be a liquid which will not readily cavitate, for if cavitation takes place to any extent in this liquid, it will mean that the vibrations will not be properly transmitted. For this purpose I may, for example, use pre-pressurized water, that is, water which has been purified with great care, and then subjected to a very heavy pressure, say for example, a pressure of 2000 atmospheres. It has been found that when water is subjected to this type of treatment and is maintained in an enclosed space so that it will retain its purity, it will substantially lose its tendency to cavitate, and therefore it can be employed to transmit vibrations involving a high rate of acceleration. In place of pre-pressurized water, it will be found that heavy-bodied oils or the like will serve better to transmit the vibrations than will ordinary untreated water. In other words, the liquid employed for transmitting the vibrations through a column should have opposite characteristics as regards cavitation from those of the liquid employed to suspend the finely-divided abrasive material.

I have mentioned above the fact that boron carbide may be employed as an abrasive. Other materials that I have successfully employed include aluminum oxide, silicon carbide, rouge and similar materials, and I have found that in general the particle size may be somewhat larger where large areas are being cut than where the tool has a small face.

It is to be understood that the examples described are given only for the purpose of illustration and may be modified in many particulars without departing from the spirit of my invention. Specifically, I have referred to the tool end as oscillating relative to the workpiece. This is certainly the simple and normal way for my process to be carried out but it would be an obvious equivalent (particularly if the workpiece is small and light) to fasten the workpiece to the end of a transducer so that it would oscillate relative to a fixed tool. Other similar equivalents may be found for various details described herein.

This application is a continuation in part of my earlier applications, Serial Number 529,072, filed April 1, 1944, and now abandoned, and Serial Number 610,270, filed August 11, 1945, and now abandoned, and also contains matter derived from the earlier application Serial Number 627,928, now abandoned, which I filed as a joint invention together with one Morris U. Cohan on November 10, 1945.

What I claim is:

1. The method of removing material from a hard, substantially non-yielding solid body to impart a predetermined contour to the treated region which consists in imparting to the end portion of an elongated tool member a contour corresponding in reverse to the contour desired, applying said tool endwise to the body to be treated while holding said tool and body against relative rotation, interposing between the tool and the work a liquid suspension of finely comminuted abrasive, engendering at the area of contact a relative oscillation of high frequency and minute amplitude and having a major component of movement in the direction of application of said tool and advancing the tool into the work as the abrasive progressively removes material from the work at the area of contact.

2. The method of removing material from a solid body so as to cut a passage therethrough of selected arbitrary cross-sectional shape, which consists in holding the body against rotation, applying to the region to be treated, and without axial rotation thereof, a tool whose external peripheral contour corresponds to the desired cross-sectional shape of the passage to be cut, interposing between the tool and work a liquid suspension of finely comminuted abrasive, engendering at the area of contact a relative oscillation of high frequency and minute amplitude and having a major component of movement in the direction of penetration of the tool into the work, and advancing the tool into and through the work as the material removal progresses.

3. A method for forming a hole in a hard, substantially non-yielding workpiece which comprises holding a tool and workpiece in determinable position relative to each other, interposing a liquid suspension of comminuted abrasive between the faces of the workpiece and the tool end, continuously exerting a pressure urging said tool against the workpiece and causing the end of the tool to oscillate relative to the workpiece in a direction having a major component of movement from and toward the workpiece at such a high rate of frequency that with an amplitude of movement of less than .05-inch, a rate of acceleration is attained equal to more than 1000 times the acceleration resulting from the force of gravity whereby despite the continuous pressure urging the tool end towards the workpiece, the force of inertia permits the tool end, with each oscillation, to separate a minute distance from the face of such workpiece and thereupon to be immediately driven back toward the workpiece, whereby abrasive particles suspended in liquid between the tool end and the workpiece are driven against the workpiece to remove material from the workpiece.

4. A method as specified in claim 3 in which the workpiece and tool are held against any substantial relative lateral movement and the advance of the tool into the workpiece is stopped before the tool passes through the workpiece to form a cavity corresponding in contour to the shape of the tool end.

5. A method as specified in claim 3 in which the tool end is caused to oscillate and the workpiece is moved toward the tool as material is removed from the workpiece.

6. A method as specified in claim 3 in which the removal of material from the workpiece is continued until a hole is formed through the workpiece.

7. A method as specified in claim 3 in which a relatively slow movement takes place between the tool and the workpiece in a direction transverse the line of relative oscillation, such movement being at so slow a rate that during 50 oscillations the maximum relative movement in the transverse direction is equal to a distance less than the maximum diameter of the tool end.

8. A method as specified in claim 3 in which the tool is advanced helically into the workpiece, the rotation of the tool being at a rate of less than one rotation for each 150 oscillations of the tool end.

9. A method as specified in claim 3 in which the tool end is caused to oscillate through the medium of a liquid column through which the oscillations are transmitted.

10. A method as specified in claim 3 in which the comminuted abrasive is suspended in water.

11. The method of forming a hole in a hard, substantially non-yielding workpiece which consists in applying to such body the end of a tool, which end is blunt and is made of softer material than the workpiece and is not in and of itself shaped for cutting or removing material from such a body, interposing between the end of the tool and the work a liquid suspension of finely comminuted abrasive, maintaining the blunt end of the tool pressed against the work and engendering at the area of contact a relative oscillation of such high frequency that with an amplitude of movement of less than .05-inch a rate of acceleration is attained equal to more than 1000 times the acceleration resulting from the force of gravity, such oscillation having a major component of movement in the direction of application of said tool and advancing the tool into the work as the abrasive progressively removes the material from the work at the area of contact.

12. A method as specified in claim 11 in which a rate of acceleration is attained equal to at least 40,000 times the acceleration resulting from the force of gravity.

13. A machine for removing material from a hard, substantially non-yielding workpiece comprising a tool head, a tool carried by said head, a workpiece holder adapted to hold a workpiece in determinable position relative to the tool, means for interposing a suspension of comminuted abrasive between the face of the workpiece and the tool end, means for continuously exerting a pressure urging said tool head and workpiece holder toward each other and means for causing the end of said tool to oscillate relative to such workpiece in a direction having a major component of movement from and towards the workpiece, said means for causing oscillations being so constructed that when operated in its normal and intended manner, the relative oscillations between the tool end and workpiece are at such a high rate of frequency that with an amplitude of movement of less than .05 inch, a rate of acceleration is attained equal to more than 1000 times the acceleration resulting from the force of gravity whereby despite the continuous pressure urging the tool head toward the workpiece, the force of inertia permits the tool to separate with each oscillation a minute distance from the face of such workpiece, and thereupon to be immediately driven back towards the workpiece whereby abrasive particles suspended in liquid between the tool and the workpiece are driven against the workpiece to remove material from the workpiece.

14. A machine for removing material from a hard, substantially non-yielding workpiece comprising a transducer having a tool member and so constructed that when operated in its normal and intended manner the end of the tool member will oscillate with such frequency that with an amplitude of less than .05 inch an acceleration is attained equal to more than 1000 times the acceleration due to gravity, a workpiece holder adapted to hold a workpiece in determinable position relative to the tool member, means for exerting continuous pressure urging said transducer and workpiece holder toward each other in a direction substantially parallel with the direction of oscillation of the end of the tool member, and means for supplying a liquid suspension of finely divided abrasive to the face of a workpiece in the holder adjacent the end of said tool member.

15. A machine as specified in claim 14 which further includes a gauge for measuring the penetration into the workpiece of a tool carried by the tool member.

16. A machine as specified in claim 14 in which the means for supplying the liquid suspension of finely divided abrasive to the workpiece comprises means for flowing such suspension on to the face of the workpiece, means for draining off excess suspension and means for recirculating such excess suspension to cause it to flow again on to the face of the workpiece.

17. A machine as specified in claim 14 in which the tool member is removable from the transducer and has a free end adapted to have a tool of desired shape attached to it.

18. A machine as specified in claim 14 in which the tool member has attached to its free end a tool with a substantially flat working face.

19. In a machine of the character described a transducer having a vibratable member adapted to serve as a tool member, said transducer being so constructed that when operated in its normal and intended manner it will set said tool member into sustained high frequency vibration with such frequency that with an amplitude of less than .05 inch, an acceleration is attained in said tool member at the point of maximum vibration equal to more than 1000 times the acceleration due to gravity, a work-supporting table, means for causing relative movement of said table and transducer to press the tool and work lightly together, such pressure being exerted in a direction substantially parallel with the direction of said high frequency vibration of the tool member and means for continuously flushing the work area with a liquid suspension of fine abrasive particles.

20. A machine as specified in claim 19 in which said last-named means comprises a pump, a conduit adapted to carry abrasive suspension from the table to said pump and a conduit adapted to carry the suspension from said pump to the work area.

LEWIS BALAMUTH.

REFERENCES CITED

The following references are of record in the file of this patent:

UNITED STATES PATENTS

| Number | Name | Date |
| --- | --- | --- |
| 1,664,823 | Knowles | Apr. 3, 1928 |
| 1,718,347 | Gipe | June 25, 1929 |
| 1,966,446 | Hayes | July 17, 1934 |
| 2,070,944 | Hillix | Feb. 16, 1937 |
| 2,293,100 | Baumgold | Aug. 18, 1942 |
| 2,363,946 | Curry | Nov. 28, 1944 |
| 2,384,435 | Bodine | Sept. 11, 1945 |
| 2,460,919 | Bodine | Feb. 8, 1949 |

FOREIGN PATENTS

| Number | Country | Date |
| --- | --- | --- |
| 553,176 | Great Britain | May 11, 1943 |